UNITED STATES PATENT OFFICE.

HORACE BILLINGS, OF BEARDSTOWN, ILLINOIS.

IMPROVED CEMENT.

Specification forming part of Letters Patent No. 28,055, dated May 1, 1860.

*To all whom it may concern:*

Be it known that I, HORACE BILLINGS, of Beardstown, in the county of Cass and State of Illinois, have invented an improved waterproof coating composition which is adapted to various useful purposes; and I do hereby declare that the following is a full and exact description thereof.

The said coating composition of matter is composed essentially of rosin and steatite, in the proportion of one hundred pounds of the former to from thirty to fifty pounds of the latter; but for the purpose of giving a greater degree of tenacity and flexibility to said composition when it is to be spread out in a thin layer upon articles that are to be exposed to rough usage, I incorporate therewith small quantities of oil and gutta-percha—say to each one hundred and fifty pounds, or thereabout, of said composition I add from ten to fifteen pounds of some oily substance and from eight to twelve pounds of gutta-percha, or either of said ingredients, as I may deem expedient. In preparing the said water-proof coating composition I reduce the rosin to a melted state, and then gradually incorporate therewith the other above-mentioned ingredients, keeping the same over a moderate fire for the space of about thirty minutes, when the said composition will be ready for use.

For the production of a water-proof and tenacious coating over canvased hams and other articles that it is desirable to preserve from atmospheric influences, I find that my said improved coating composition excels all other preparations.

There are also many other coating purposes to which the said composition might be usefully applied, but which it is not necessary to enumerate in this specification.

What I claim as my invention, and desire to secure by Letters Patent, is—

A water-proof coating composition whose peculiarity consists in its being mainly composed of rosin and pulverized steatite, incorporated with each other in about the proportions and in the manner herein set forth.

The above specification of my improved water-proof and flexible cement signed this 16th day of February, 1860.

HORACE BILLINGS.

Witnesses:
DAVID BLACK,
D. C. MEIGS.